United States Patent Office 3,103,149
Patented Sept. 10, 1963

3,103,149
PHOTOGRAPHIC CAMERA WITH AUTOMATIC
EXPOSURE CONTROL
Naoyuki Ohara, 436 1-chome, Seshigaya, Setagaya-ku,
Tokyo-to, Japan
Filed Dec. 28, 1960, Ser. No. 79,046
Claims priority, application Japan Oct. 20, 1960
3 Claims. (Cl. 95—10)

This invention relates to photographic cameras, and more particularly it relates to a camera with a built-in exposure meter and with automatic control of exposure.

It is an object of the present invention to provide a photographic camera with automatic exposure control which is of greatly improved construction and is extremely positive in operation.

It is another object of the invention to provide a camera which has the above-stated construction and, additionally, is adapted to provide interchangeability of lenses.

It is yet another object of the invention to provide, attendant to the above-stated camera, a lens tube having a built-in diaphragm actuating mechanism which makes possible automatic control of exposure.

A further object of the invention is to provide a camera as stated above which has a shutter speed setting member and a diaphragm setting member, and wherein the said diaphragm setting member functions doubly as a member for manual selection of diaphragm setting and as a member for switching over to automatic control; the switching over of the said member from manual to automatic operation is caused to be possible only during a preset exposure time within a certain limited range within the exposure time (shutter speed) which is adjustable by the aforesaid shutter speed setting member; and the shutter speed selection after the said switching over is caused to be regulated within a limited range, whereby the automatic control of exposure can be effected in an extremely simple and positive manner.

It is a further object of the invention to provide a so-called single-lens reflex camera which embodies the above-described camera with automatic exposure control, and wherein a rotatably supported blade opening member is disposed coaxially about the optical axis and caused by the charging or cocking thereof to open the blades in a preparatory manner prior to the opening and closing of the blades for the original purpose of photography, thereby enabling the adjustment of focus through the lens system; or a single-lens reflex camera of the so-called quick-return mirror type wherein, by charging or cocking the aforesaid blade opening member immediately after the opening and closing of the blades for the original purpose of photography, the reopening of the blades is made possible.

It is yet a further object of the invention to provide a camera with automatic exposure control which possesses the various features of performance as described above yet has a simple and easily and economically fabricated construction.

The manner in which the foregoing objects, other objects, and advantages may best be achieved, as well as the details of the invention, will be understood more fully from a consideration of the following description, taken in conjunction with the accompanying drawings of a few representative embodiments of the invention in which the same or equivalent parts are designated by the same reference numerals or letters, and in which.

The principal aspects of the princple of the invention will be explained in the following description with reference to FIG. 1. A shutter blade opening member 1 is disposed in a rear position as shown. A diaphragm blade opening member 3, which is provided with a clockwise rotating torque by a spring 6, has a latching pawl 4 at the top thereof which is comovably contacting a forwardly extending lug 2 of the blade opening member 1. At a forward part of the mechanism, a first diaphragm actuating member 7, which is provided with a clockwise rotating torque by a spring 9, has a pawl 8 provided thereon which is comovably contacting a forwardly extending lug 5 of the diaphragm blade opening member 3. Said first diaphragm actuating member 7 and a second diaphragm actuating member 10, together, support therebetween several diaphragm blades (not shown) in such a manner as to enable the actuation of said blades. The said second diaphragm actuating member 10 is also provided with a clockwise rotating torque by a spring 13. The member designated by the reference numeral 11 is a pawl which is so mounted as to slide a predetermined distance relative to the second diaphragm actuating member 10 and is pulled to a fixed position by a spring 12 which is stronger than the spring 13 for the second diaphragm actuating member 10. The actuation of the diaphragm will be more clearly apparent from the description which will be given presently.

A diaphragm setting ring 14 is disposed behind the aforesaid first diaphragm actuating member 7 and is provided with a forwardly extending lug 15 which, acting through the pawl 11 of the aforesaid second diaphragm actuating member 10, arrests the rotation due to the spring 13 of the said member 10. In the vicinity of the outer side of the calibration for minimum diaphragm opening of the diaphragm scale on this ring 14, an automatic operation mark A is inscribed in alignment for the switching of the diaphragm control from manual adjustment to automatic control or the reverse. A common index 16a is provided for both the diaphragm scale and the automatic operation mark A. A shutter speed setting ring 17 for the selection of shutter speed is disposed between the ring 14 and member 3, and its scale reading is indicated by an index 16b. It is possible to adapt this index 16b so that it will function doubly as also the aforesaid index 16a. A correction ring 18 for correcting a built-in exposure meter in accordance with various photographic factors is disposed between the aforementioned blade opening member 1 and diaphragm blade opening member 3. In accordance with such factors as the film sensitivity and film factor, the coupled position of this correction ring 18 relative to the shutter speed setting ring 17 is varied by reengaging the click detent spring 19 which is fixed to the said ring 18 and is engageable with calibrated notches cut in the said ring 17. A correction lever 21, which is fixed to one end of a shaft 22 and caused to have a tension-maintained torque tending to rotate it in the counterclockwise direction, has at its tip a pin which is in elastically-maintained contact with a cam surface 20 on the aforesaid correction ring 18. This lever 21 is thereby caused to move in response to corrective adjustments such as those for the sensitivity of the film used and filter factor and, furthermore, to the shutter speed selection due to the shutter speed setting ring 17. This movement of the lever 21 is transmitted through the shaft 22 to its other end, then through a gear train 23, 24, 25, and 26 to cause an exposure meter 27, itself, to rotate, without causing variation in the deflection angle of the exposure meter pointer 28 produced independently by the exposure meter 27 in response to the brightness of the object being photographed.

A coupling gear 30 is intermeshed with a gear tooth portion on the diaphragm blade opening member 3 and rotates a coupling shaft 31 to which it is fixed. At the other end of the coupling shaft 31, its movement is transmitted through a gear train 32, 33, 34, 36, and 38, which is coupled thereto by a clutch mechanism 37, and through a rack 39 to actuate a coupling cam plate 40, which is installed to confront and function in cooperation with the exposure meter pointer 28.

On one hand, a cam (not shown) having cam action in the direction of the optical axis is provided on the reverse surface of the diaphragm setting ring 14. One end of a switching rod 42, which is movable in the direction of the optical axis, is in elastically-maintained contact with the said cam, and the other end is in elastically-maintained contact with a lever 43. One end of the said lever 43, which is rotatable above a pivot 44, is engaged with the aforesaid switching rod 42, and the other end is a clutch lever which engages and disengages the clutch 37 in the gear train 36 and 38, and the said lever 43 is caused by a spring 35 to maintain one end of the switching rod 42 continually pressed against the aforesaid cam surface on the reverse surface of the diaphragm setting ring 14. Accordingly, when the diaphragm aperture scale on the diaphragm setting ring 14 is positioned so that the setting members, and not the mark "A," coincide with the index 16a, the switching rod 42 is pushed downward by the said cam on the reverse side, and this movement is transmitted through the clutch lever 43 to disengage the clutch 37. Since this disengagement of the clutch 37 causes the movement of the coupling gear 30, which is intermeshed with the gear tooth portion of the diaphragm blade opening ring 3, to be cut off, it is then unable to actuate the coupling cam 40, which is then returned by its own spring 41 to its starting position to await subsequent action and the exposure is manually controlled until the setting ring is returned to the position where A coincides with index 16a.

When the automatic operation mark A of the diaphragm setting ring 14 is made to coincide with the index 16a, the switching rod 42 is pushed out forward by the rear cam (not shown) and spring 35, whereby the clutch 37 is clutched by way of the clutch lever 43. In this state, when the blade opening member 1 is rotated counterclockwise in order to charge, the lug 2 is accompanied by the blade opening member 3 and the lug 5 of said blade opening member 3 is accompanied by the first diaphragm actuating member 7 so as to rotate the said member 7 in the same direction, whereby the diaphragm blades are wholly opened. In this time, the said blade opening member 1 is locked at its charged state. When the said blade opening member 1 commences to rotate clockwise by camera release operation, the diaphragm opening member 3 commences to follow the movement of the said blade opening member 1 by its spring 6. At the same time, because of engagement of the coupling gear 30 with the diaphragm operating member 3, the coupling cam 40 which has been ready for operation is lowered in accordance with said following movement of the diaphragm opening member 3 by way of the coupling shaft 31, gear train (32, 33, 34, 36, 38, 39) and the clutch 37. On the other hand, the coupling gear 30 itself is rotated in accordance with the selected shutter speed and exposure index of the used film and is oscillated in accordance with brightness of the object obtained by the exposure meter the position of which has been determined. In this state, the said following movement of the diaphragm opening member 3 continues until the lowering movement of the said coupling cam 40 is stopped by the stopped pointer 23. Accordingly, the first diaphragm actuating member cooperating with the said diaphragm opening member (3) through its arm 5 and the spring 9 is restored to the position where the said diaphragm opening member 3 has stopped after its restoration, whereby a suitable aperture of the diaphragm is formed. However, the blade opening ring 1 continues its restoring movement without relation to stop of the diaphragm opening member 3 and releases the shutter upon termination of said movement, whereby exposure is carried out, thus terminating a photographing of one time. Even in the case of the same photographing condition, when a film having a different light sensitivity and a different shutter speed is selected, corresponding compensation is given by the self-rotation of the exposure meter, so that the obtained diaphragm opening aperture is always correct. This fact can be understood from the above detailed description relating to exposure automatic control.

In the case of manual selection of the diaphragm, a desired diaphragm value among the diaphragm dial markings of the diaphragm setting ring 14 is made to coincide with the mark 16a, whereby the switching rod 42 is pressed downward by the rear cam, thus causing release of the clutch and rotation of the second diaphragm actuating member 10 against the spring 13 through the pawl 11 of the said member 10. In this state, when the blade opening ring 1 is rotated counterclockwise to lock the camera, the diaphragm blades are totally opened in the same manner as the case of the above-mentioned automatic control, whereby the said ring 1 is brought in its locked state. When the said ring 1 is made to be restored clockwise by means of the camera release, the diaphragm opening member 3 and first diaphragm actuating member 7 follow the restoration movement of the said ring 1 by way of the restoring springs 6 and 9 and the gear 30 being in engagement with the diaphragm opening member 3 is also rotated. However, since the clutch 37 is not engaged, the coupling cam 40 does not start, so that it has no relation to the exposure pointer 28 and carries out the same process as that of the said ring 1, whereby the diaphragm aperture selected by the diaphragm scale ring 14 is obtained. According to the above description, it will become clear that automatic control and manual operation of the exposure can be sufficiently and surely carried out in accordance with the principle of FIG. 1 of this invention.

Referring now to FIGS. 2 through 8, wherein is illustrated one embodiment of the invention as applied to an interchangeable-lens type, single-lens reflex camera, the reference numeral 50 designates the front plate of the camera, to the front surface of which a shutter body 51 capable of performing the operations necessary for a single-lense reflex camera is mounted, and a bayonet mount 53 is fixed through the interposition of an intermediate ring 52. A connection terminal, that is, a plug 54 for the electric circuit for flash photography is likewise mounted on the front plate 50. (A separate patent application for a representative shutter 51 has already been filed by the present applicant: U.S. patent application, Serial No. 15,-863, May 18, 1960, Naoyuki Ohara, "Lens Shutter for Single-Lens Reflex Camera," from a consideration of which the following description will be more clearly apparent.)

The blade opening member 1 is charged, or cocked, in clockwise direction by an actuating pin 1a and is locked in the charged, or cocked, position by the engagement of a cut-out 1b formed thereon by a latch pawl 55 which has elastic torque in the clockwise direction. A camera release button 56 is provided on the camera body side. When this button 56 is pushed, its movement is transmitted by its extension end, through an intermediate lever 57, to cause a trigger release lever 58 to release the aforesaid latch pawl 55, which is locking the blade opening member 1 in its cocked position, from the cut-out 1b. When a release lever 59, which is disposed coaxially with the latching pawl 55 is released by a protruding tooth 1c on the blade opening member 1, it is pushed back to the position illustrated and releases the shutter in this position, whereby the opening and shutting of the shutter blades for exposure are accomplished.

Figure 4:
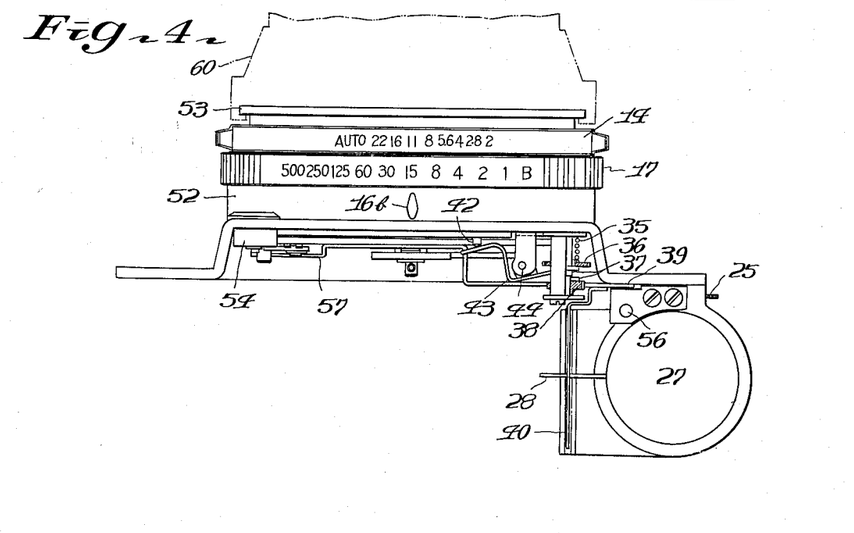
FIG. 4 is a plan or top view of the embodiment of FIG. 2.
Figure 5:
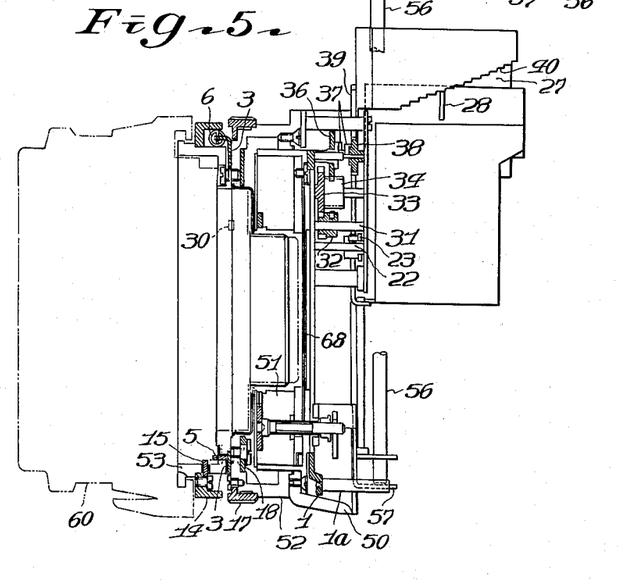
FIG. 5 is a sectional view, taken on a vertical plane passing through the optical axis, of the embodiment of FIG. 2.

Referring to FIGS. 4 and 5, the chain line with two dots indicates the outline of an interchangeable lens assembly 60, which is attached to the camera by the engagement of a bayonet lug 61 on the lens side with the bayonet mount 53 on the camera side. The external appearance and the internal construction of the lens assembly are illustrated in detail in FIGS. 6 and 7. These details and the relations at the time of changing lenses will be more apparent from a description to follow presently.

On the basis of the above description of various members, the operation of the camera of the present invention will be best understood from the following description, when read in connection with FIGS. 1 through 8, which illustrate the principle of the invention and one embodiment of the invention as applied to a single-lens reflex camera of interchangeable lens type.

When the diaphragm scale range of the diaphragm setting ring 14 is confronting the index 16a in the condition wherein selection of the diaphragm setting can be accomplished, the camera is a manually operated camera wherein the diaphragm and the shutter speed can each be adjusted independently. Then, when the automatic operation mark A on the diaphragm setting ring 14 is brought to coincide with the index 16a, the camera becomes an automatically operated camera wherein the diaphragm setting is automatically adjusted in accordance with the speed selection of the shutter speed setting ring 17 with respect to the index 16b.

Figure 1:
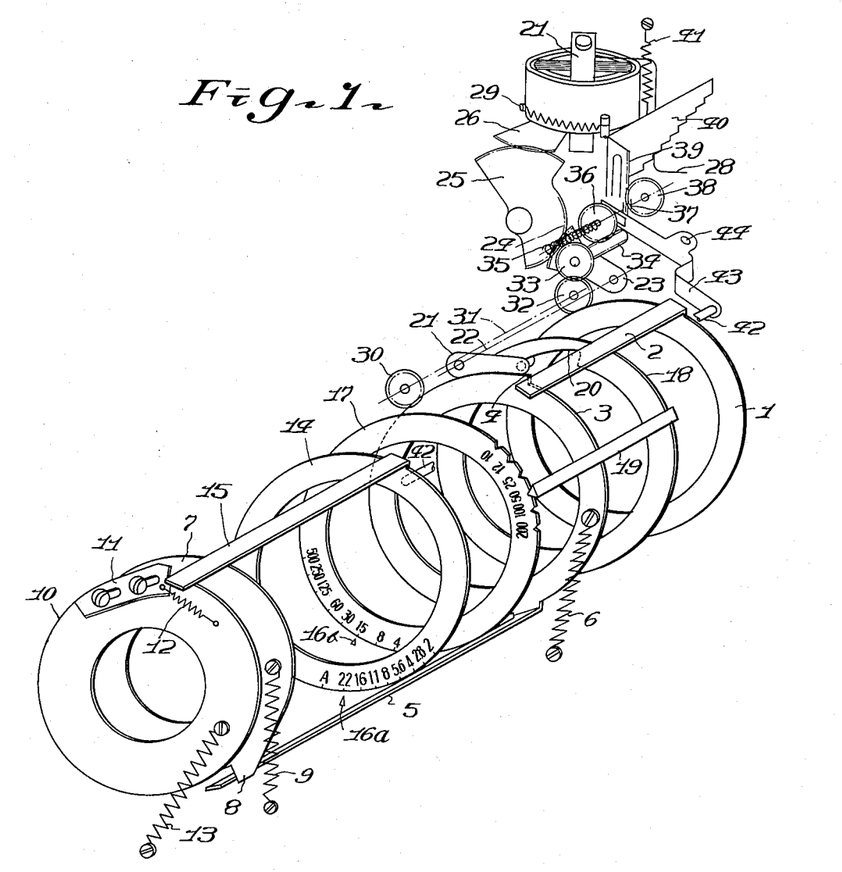
FIG. 1 is an exploded perspective view for an explanation of the principle of the invention.
Figure 2:
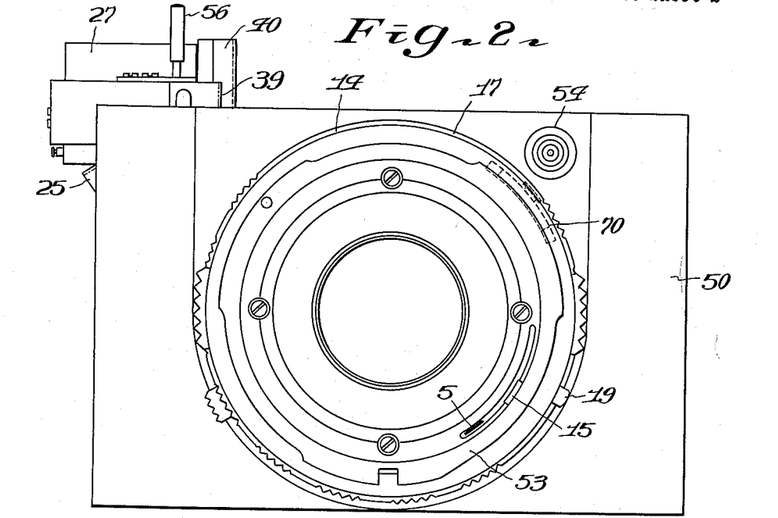
FIG. 2 is a front elevational view, showing one embodiment of the invention as applied to a single-lens reflex of interchangeable lens type.
Figure 3:
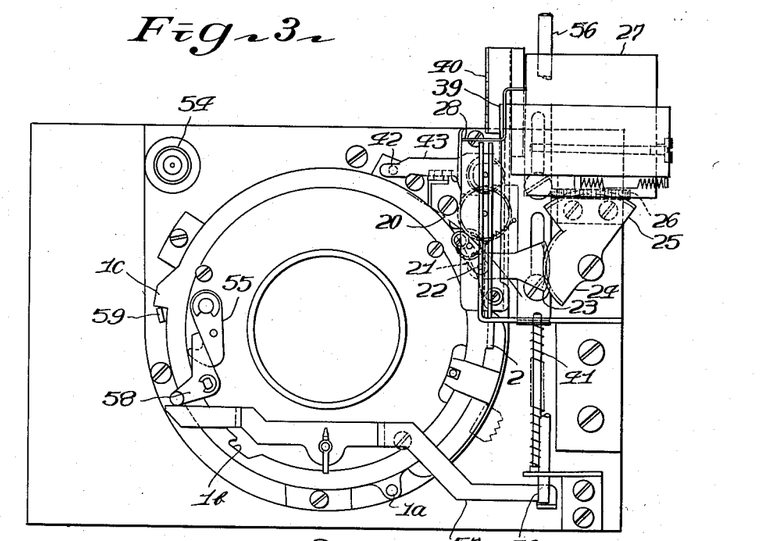
FIG. 3 is a rear elevational view of the embodiment of FIG. 2.

Referring to FIG. 1, when the automatic operation mark A of the diaphragm setting ring 14 is brought to coincide with the index 16a, the switching rod 42 is actuated by the cam (not shown) on the reverse surface of the diaphragm setting ring 14 and causes the clutch 37 in the coupling gears 36 and 38 to engage. Then, when the blade opening member 1 is rotated in the counterclockwise direction and cocked, its movement is transmitted through an intermediate device (not shown) to open the shutter blades fully and, at the same time, to cause the diaphragm blade opening ring 3 to move in unison. The said ring 3 causes, through its forwardly extending lug 5, the first diaphragm actuating member 7 to move in unison, and the diaphragm blades 64 are fully opened by the actuation due to the said member 7. Thus, the camera is able to adjust its focus as a single-lens reflex camera. At the same time, the rotation of the diaphragm blade opening member 3 is transmitted through the coupling gear 30 intermeshed with the gear tooth portion of said member 3, through the coupling shaft 31 which is the rotational shaft of the said gear 30, through the gear train 32, 33, 34, 36, and 38, and then through the rack 39 to cause the coupling cam 40 to be in a preparatory position for starting with respect to the exposure meter pointer 28. In this case, however, the special amount of rotation (F:22 to mark A) necessary for the switching of the diaphragm setting ring 14 for switching the camera to automatic control must not change the limiting position of the degree of opening of the diaphragm which has already been set. That is, for this requirement, the movement of the forwardly extending lug 15 accompanying the said special amount of rotation does not participate at all in the operation of the second diaphragm actuating member 10 and is limited in moving only the pawl 11. Otherwise, the mutually relative positions of the two diaphragm actuating members (7 and 10) will be disturbed, and the diaphragm aperture will be changed. For this purpose, the pawl 11 of the second diaphragm actuating member 10 is adapted to operate with respect to only the aforesaid special amount of rotation of the diaphragm setting ring 14, independently of the actuating member 10, to maintain the limiting value of the diaphragm aperture.

On the other hand, when the automatic operation mark A is separated from the index 16a and the diaphragm setting ring 14 is turned to a diaphragm scale position in order to switch the automatic control condition of the camera to manual control condition, the pawl 11 which follows up the movement of the forwardly extending lug 15 returns once to the position indicated in the drawing, independently of the second diaphragm actuating member 10, and thereafter moves in unison with the second diaphragm actuating member 10 in accordance with the selection of the diaphragm setting.

It will be obvious from the above description that, when the automatic operation marker A of the diaphragm setting ring 14 is brought to coincidence with the index 16a, and the blade opening member 1 is rotated counterclockwisely to cock it, the system illustrated in FIG. 1 is in the following state. That is, the coupling cam 40 which is provided to confront and operate cooperatively with the exposure meter pointer 28 is placed in the starting position awaiting operation, and the second diaphragm actuating member 10 is stopped in the limiting position for minimum diaphragm aperture, but the diaphragm blades 64 are maintained fully open by another means, that is, by the aforesaid first diaphragm actuating member 7, and the shutter blades 68 are similarly maintained fully opened by the shutter blade opening member 1. If, under these conditions, the first diaphragm actuating member 7 is rotated clockwisely, the diaphragm blades will be stopped down until, at the end of their movement, they will attain their minimum aperture condition for the first time. Accordingly, by stopping the diaphragm actuating member 7 at any suitable point of this movement, it is possible to obtain any desired diaphragm aperture.

Next, when the click spring 19 is set on the film exposure index scale on the shutter speed setting ring 17 in accordance with the exposure index of the film used, and the said ring 17 is subjected to the rotation for selection of the shutter speed, the correction ring 18 is rotated in unison by the click spring 19, and the correction lever 21 which is in elastically-maintained contact with the cam surface 20 of the said ring 18 is caused to rotate with the correction shaft 22 as the center of rotation. This movement is transmitted through the gear train 23, 24, 25, and 26 to rotate the exposure meter itself, and, without changing the angular displacement of the exposure meter pointer 28 due to the response of the brightness of the object being photographed, the position of the said exposure meter pointer 28 is varied according to the corrected sensitivity (due to the film sensitivity, filter factor, and shutter speed, etc.). Accordingly, the appropriate diaphragm setting is exhibited with respect to the stepped edge of the coupling cam 40 which is installed to confront the position of the exposure meter pointer 28, and which is awaiting operation in the starting position.

If, in this condition, that is, in the case of an automatic exposure control camera, the camera shutter is released by means of the body release button 56, the movement of the said bottom 56 will be transmitted through the intermediate lever 57 and release lever 58 to disengage the latch pawl 55 from the cut-out 1b in the blade opening member 1. Consequently, the blade opening member 1 will begin to return in the clockwise direction. First, the shutter blades are closed, then the rotational movement in the clockwise direction of the diaphragm blade opening member 3 which is being returned by the spring 6 is transmitted through the coupling gear 30, coupling shaft 31, gear train 32, 33, 34, 36, and 38 and rack 39 and proceeds until the coupling cam 40 is stopped by the exposure meter pointer 28, which, being held fixed in its indicated position at the beginning of the release operation, acts as a stopper. Thus, the limiting stop position for the clockwise rotation of the first diaphragm actuating member 7 due to the force of the spring 9 of the said member 7 is determined; the diaphragm blades 64 are stopped down to the appropriate diaphragm aperture; and the so-called automatic diaphragm control due to an exposure meter is achieved.

Furthermore, in the case of a single-lens reflex camera, the opening and shutting of the shutter blades for the purpose of exposure is accomplished when, after the mirror and film cover plate, which had been covering the film, have been raised by a known method, the shutter release lever 59 is released by the action of the protrusion 1c on the blade opening member 1 accompanying the return movement of the said member 1 to its initial position.

Next, in the case wherein the present camera is to be used as a so-called manual-operation camera in which the diaphragm setting may be selected manually, the diaphragm setting ring 14 is rotated, displacing the automatic operation mark A from the index 16a, and the desired diaphragm setting is manually selected. Since this operation causes the cam (not shown) on the reverse surface of the diaphragm setting ring 14 to push the switching rod 42 downwardly, the clutch lever 43 rotates counterclockwisely against the force of the spring 35. Consequently, the clutch 37 is disengaged, and the coupling between the gear 36 and the gear 38 is cut. Then, when the camera shutter is released, the clockwise rotation of the diaphragm opening member 3, which is caused to return by the spring 6, is not limited by the exposure meter pointer 28. Therefore, together with the first diaphragm actuating member 7, the said member 3 operates through its own maximum operating angle.

On one hand, the forwardly extending lug 15 of the diaphragm setting ring 14 determines the rotational position to which the second diaphragm actuating member 10 is rotated clockwisely and returned by the spring 13. The second diaphragm actuating member 10 stops at this position and controls the diaphragm blades 64 so that they form a diaphragm aperture corresponding to the diaphragm value preselected at the final position of the rotation of the first diaphragm actuating member 7. The control movements of the diaphragm blades 64 are achieved by a construction wherein, in the case of each blade, a pin 65 on one side thereof is engaged with a circular hole 10b in one of the two diaphragm actuating members 7 and 9, and the pin 66 on the other side is engaged with a cam slot 7b of an obtuse V shape in the other diaphragm actuating member, one portion of the said slot 7b extending substantially along an arc of a circle which is concentric with the said diaphragm actuating member, and the remainder portion of the said slot 7b extending in a direction which is substantially tangential to the center hole of the said diaphragm actuating member. (This feature is covered by the patent application already filed by the present applicant: U.S. patent application, Serial No. 17,695, March 25, 1950, Maoyuki Ohara, "Device for Visually Verifying the Depth of Field for Lens Shutters of Single-Lens Reflex Cameras," which should be referred to for further details.)

When the blade opening member 1 is cocked, the movement is transmitted through an intermediate device (not shown) to open the shutter blades fully, similarly as in the case of the automatic exposure control camera. At the same time, this movement is transmitted through the diaphragm blade opening member 3 to rotate in unison the first diaphragm actuating member 7 and to open the diaphragm blades 64 fully, thereby making possible the adjustment of focus as a single-lens reflex camera.

In this condition, that is, in the case of a manual exposure control camera, if the camera shutter is released by means of the body release button 56, the blade opening member 1 will be driven clockwisely, similarly as in the case of the automatic exposure control camera, and the diaphragm blade opening ring 3 and the first diaphragm actuating member 7 will be caused by their respective springs 6 and 9 to follow up this movement to begin a return movement in the clockwise direction. As a result, the shutter blades are first closed in a preparatory manner, and the diaphragm blades are stopped down to a diaphragm aperture of preselected value. Then the known operation of a single-lens reflex camera takes place, followed by the opening and shutting operation of the shutter blades for the purpose of exposure.

It will be apparent from the detailed description presented above of the principle and embodiment of the present invention that the several objects set forth in the beginning of this disclosure and the accompanying advantages can be achieved by a simple construction and, moreover, in a sure manner. Furthermore, from the embodiment applied to the interchangeable lens type, single-lens reflex camera of this invention, the following points will be understood readily and simply.

If the cocking of the main drive device and the blade opening member 1 of the shutter are intercoupled and so adapted as to take place simultaneously, it will be possible to provide a conventional, interchangeable lens type, single-lens reflex camera wherein, through the operation of the blade opening member 1, the diaphragm blades are fully opened similarly as are the shutter blades, and focal adjustment through the lens system is possible only at the time of the cocking of the shutter. (The simultaneous cocking of the shutter and the feeding of the film in many of the cameras produced at present is well known in the art. Accordingly, in many cases, the cocking of the shutter means the simultaneous feeding of the film.)

Then, by adapting the main driving device and the blade opening member 1 of the shutter so that their respective cocking can be accomplished independently, cocking the blade opening member 1 immediately after the opening and shutting of the shutter blades for purpose of exposure by utilizing the energy stored at the time of cocking the shutter, and reopening the diaphragm blades in the same manner as the shutter blades, it is possible to provide a single-lens reflex camera of interchangeable lens, quick-return type wherein focal adjustment is possible through the lens system irrespective of the sequence, prior to or after, the cocking of the shutter.

It will be obvious, furthermore, that by severing the relationship between the blade opening member 1 and the device which additionally opens and closes the shutter blades (the device which until now has been referred to in the foregoing description as the "intermediate device (not shown)"), it is possible to provide an ordinary, interchangeable lens type camera, which is not of the single-lens reflex type, and wherein the cocking of the blade opening member 1 merely fully opens only the diaphragm blades 64 and thereafter operates as described in detail above, the shutter speed and diaphragm value can be selected manually, and automatic control of the diaphragm is possible.

While the above description has related to an interchangeable lens type camera, the invention may be applied also to a camera of non-interchangeable lens type. For example, in the diagram of FIG. 1 indicating the principle of the present invention, such a camera may be constructed by assembling in the shutter two diaphragm actuating members 7 and 10 and diaphragm blades 64 which are supported controllably by the said members; constructing the diaphragm blade opening member 3 and the first diaphragm actuating member 7 as an integral body, or engaging and coupling the forwardly extending lug 5 of the said member 3 to a portion of the diaphragm actuating member 7, recessed from the outer edge thereof, for example, a cut-out recess; engaging and coupling the forwardly extending lug 15 of the diaphragm scale ring 14 to a portion of the pawl 11 of the second diaphragm actuating member 10, recessed from the outer edge thereof, for example, a cut-out recess; and deleting the pawl 8 of the diaphragm actuating member 7 and the springs 9 and 13 of the diaphragm actuating members. It will be apparent that even with this simple construction, since the two diaphragm actuating members 7 and 10 perform the same operations as previously described, the same operational effect is achieved, and, accordingly, it is possible to provide a camera with automatic exposure control.

However, since one embodiment of the invention is of the interchangeable lens type, the relationships of the pawl 8 and pawl 11 of the first and second diaphragm actuating members 7 and 10 to the forwardly extending lugs 5 and 15 of the diaphragm blade opening member 3 and diaphragm setting ring 14, respectively, at the time of lens changing will be made apparent by the following detailed description.

Figures 6, 7:
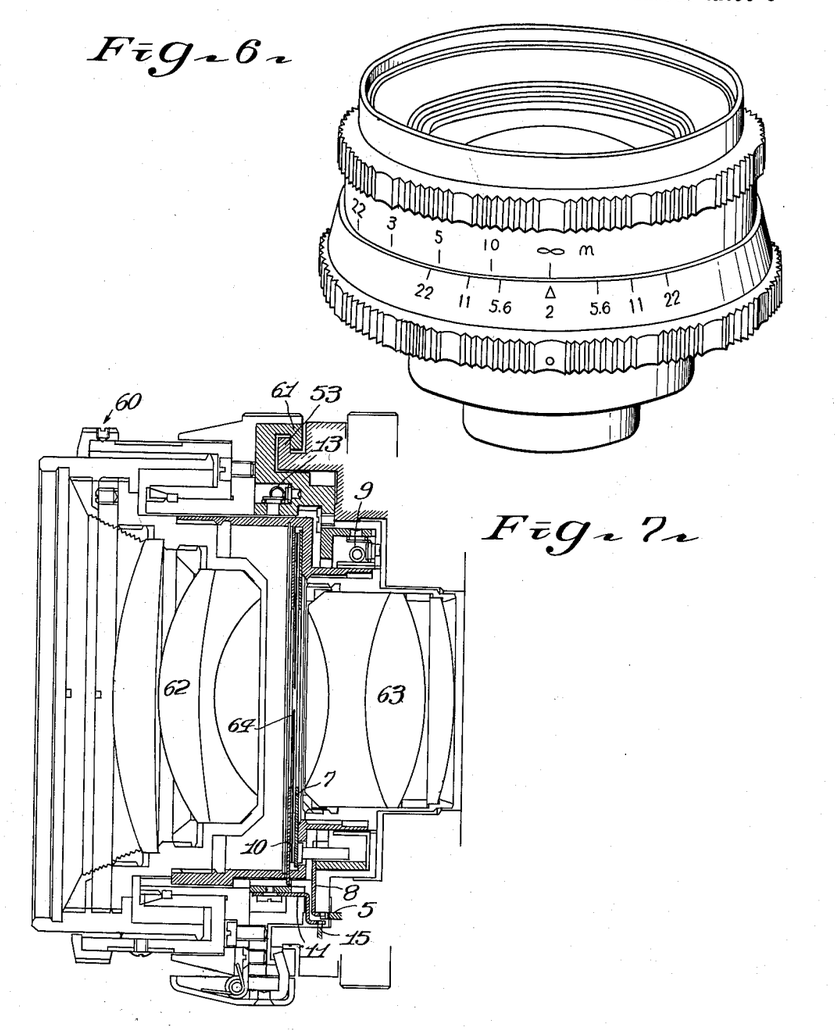
FIG. 6 is a perspective view showing the exterior of a representative embodiment of an interchangeable lens assembly according to the invention.
FIG. 7 is a sectional view, taken on a vertical plane passing through the optical axis, of the embodiment of FIG. 6.
Figure 8:
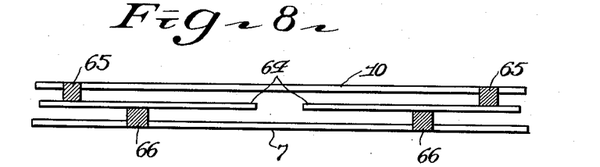
FIG. 8 is schematic diagram, partly in section, showing the essential members of the diaphragm mechanism for a lens according to the invention.
Figure 8A:
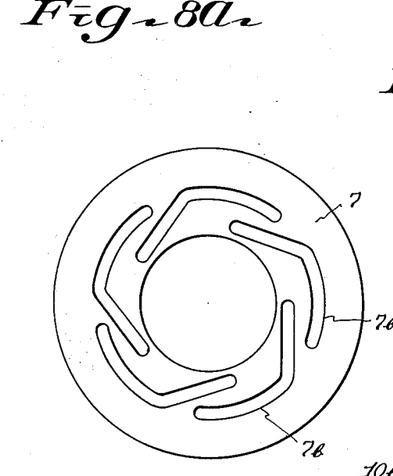
FIG. 8a, FIG. 8b, and FIG. 8c are front elevational views of the essential members of the mechanism shown in FIG. 8.
Figure 8B:
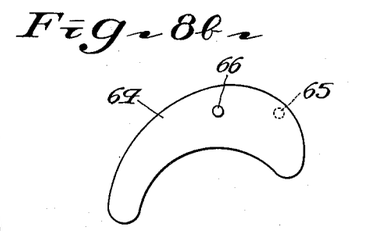
Figure 8C:
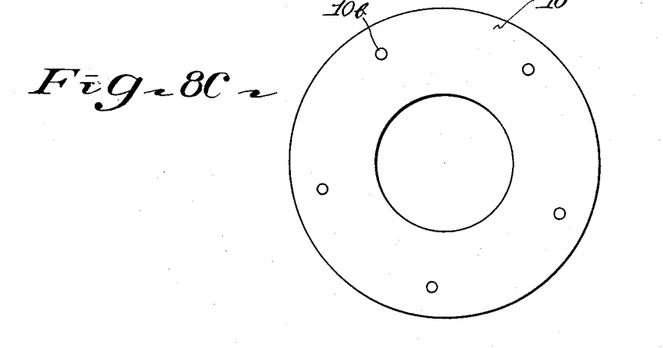
Figure 8D:
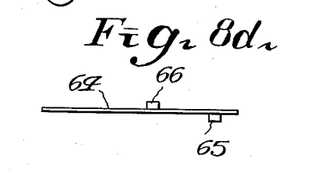
FIG. 8d is an edge view of FIG. 8b.
Figures 9, 10, 11:
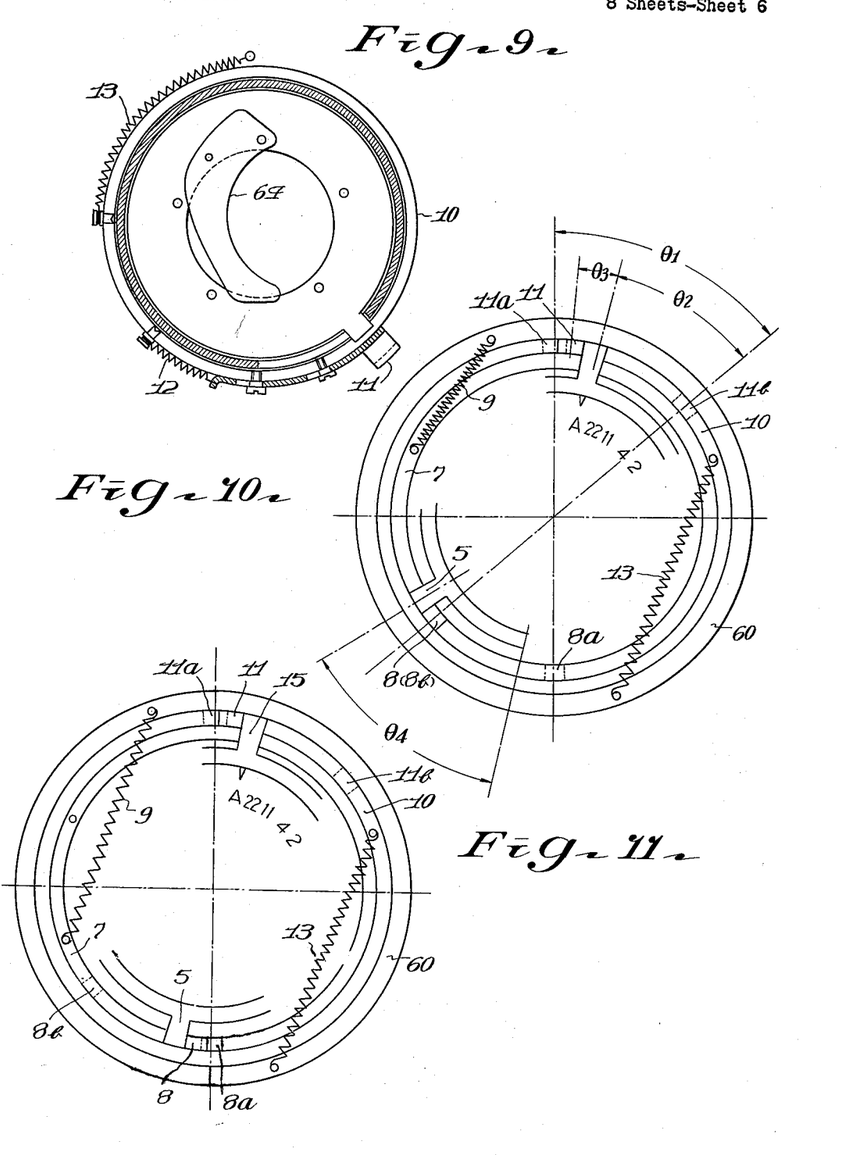
FIG. 9 is a front elevational view, partly in section, showing a diaphragm mechanism for a lens.
FIGS. 10 through 13 are diagrams indicating the positional relations of certain members of the diaphragm mechanism relative to the camera body.

Of the three illustrations, FIGS. 7, 8, and 9, FIG. 7 indicates the condition wherein the diaphragm actuating mechanism consisting of these two diaphragm actuating members 7 and 10 is installed between the optical system 62 and 63 of the interchangeable lens assembly 60; this interchangeable lens assembly, by means of the bayonet lug 61 thereon, is connected to the bayonet mount 53 of the camera body; and the springs 9 and 13 are caused to function on their respective diaphragm actuating members 7 and 10 so that the pawl 8 and pawl 11 of the said respective diaphragm actuating members are correlated, respectively, to the forwardly extending lugs 5 and 15 of the diaphragm blade opening member 3 and diaphragm setting ring 14 on the body side. This explains how, even when the interchangeable lens are each connected to the camera body with a certain rotational angle, the two pawls 8 and 11 and the forwardly extending lugs 5 and 15, which constantly occupy mutually different positions, are maintained in mutual correlation by the springs 9 and 13 which impart tension on the two diaphragm actuating members 7 and 10. Furthermore, it is necessary to establish a relationship of the correlation respectively between the two pawls 8 and 11 and the forwardly extending lugs 5 and 15 to the state of the interchangeable lens side corresponding to the various conditions due to the operation of the diaphragm actuating mechanism on the camera body side (automatic control or manual control, or prior to or after the cocking of blade opening member). The following is a description of this relationship with reference to FIGS. 10 through 13.

FIG. 10 indicates the condition wherein the camera has been switched to automatic control, and the interchangeable lens 60 has been connected to the camera body prior to the cocking of the blade opening member. In the general case of bayonet mounting, it is common practice to adapt the mount so that, by mounting the lens side and rotating it from 50 to 60 degrees, it is held positively. Accordingly, if at the time the lens is mounted in the case of FIGS. 1 and 10, the pawls 8 and 11 of the first and second diaphragm actuating members occupy, respectively, the positions 8a and 11a, said pawls 8 and 11 will obviously be caused by the subsequent, clockwise rotation of the lens (rotation of angle $\theta_1$ indicated in FIG. 10) to be in the positions 8b and 11b, respectively. However, the pawl 8 engages with the forwardly extending lug 5 of the diaphragm blade opening member 3 at the terminal position of rotational angle of the lens, and the pawl 11, on one hand, is prevented by the forwardly extending lug 15 of the diaphragm setting ring 14 to rotate together with the lens, and merely stretches the spring 13. It will be understood, therefore, that as a result, the pawls 8 and 11 possess mutual correlation due to, respectively, the forwardly extending lugs 5 and 15 by the springs 9 and 13 and are in accordance with the principle indicated in FIG. 1.

FIG. 11 indicates the condition wherein the camera has been switched to automatic control, and the interchangeable lens 60 has been connected to the camera body after the cocking of the blade opening member. When the lens is mounted under these conditions, the pawls 8 and 11 of the first and second diaphragm actuating members occupy the positions 8a and 11a and, together with the clockwise rotation of the lens, engage with the forwardly extending lugs 5 and 15 of the diaphragm blade opening member 3 and diaphragm setting ring 14 thereby being stopped. Thereafter, the said pawls stretch the springs 9 and 13 of the first and second diaphragm actuating members. Accordingly, it is obvious that they are in accordance with the principle indicated in FIG. 1.

Figure 12:
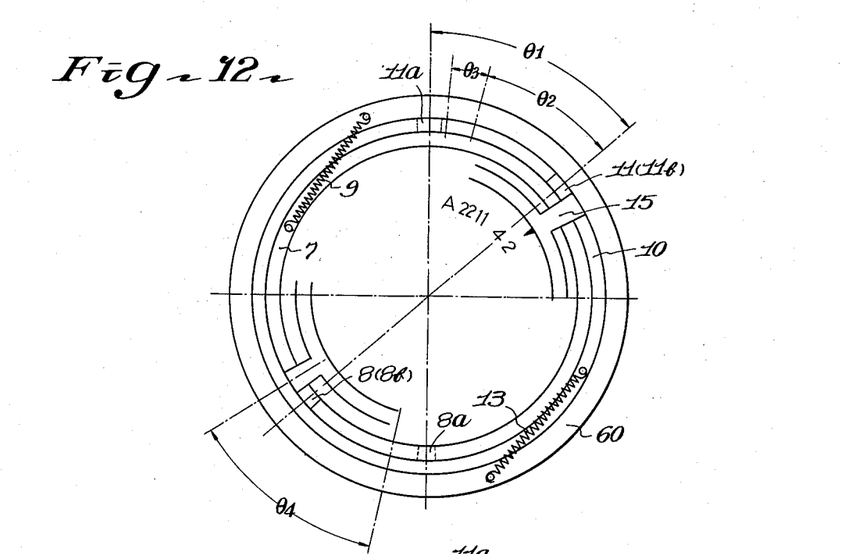
Figure 13:
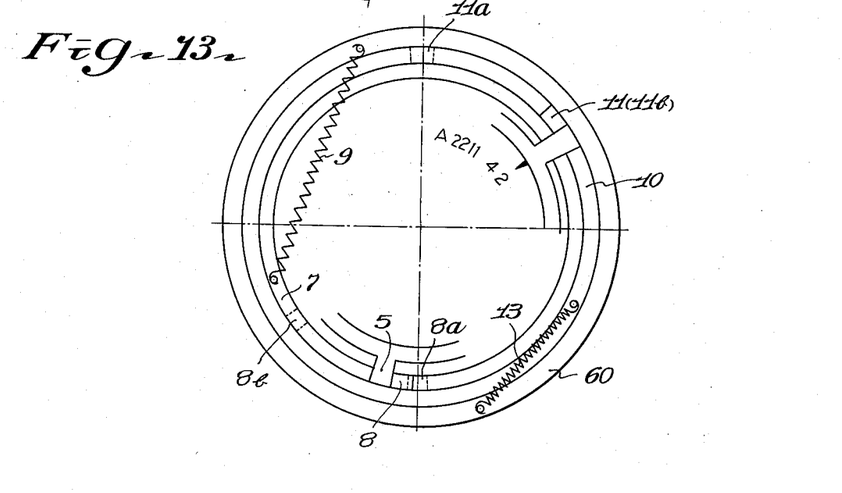

FIGS. 12 and 13 indicate the conditions wherein the camera has been switched to manual control, and the interchangeable lens 60 has been connected to the camera body prior to and after the charging of the blade opening member. It will be seen that, in both of these cases, the pawls 8 and 11 of the respective diaphragm actuating members engage correlatedly with the forwardly extending lugs 5 and 15, similarly as in the cases illustrated in FIGS. 10 and 11.

The above relationship may be represented more mathematically by the following representations in which:

$\theta_1$ denotes the angle of rotation of the lens required for attachment and detachment;

$\theta_2$ denotes the range of adjustment of diaphragm, being, in the present embodiment, from F:2 to F:22;

$\theta_3$ denotes the angle of rotation by which the diaphragm setting ring exceeds the diaphragm adjustment range $\theta_2$, that is, the minimum angle of rotation of the diaphragm setting ring necessary for switching from manual to automatic control, or in reverse, from automatic to manual control; and $\theta_4$ denotes the cocking angle of the blade opening member.

Then, in the present embodiment, $$\theta_1 > \theta_3 + \theta_2$$

and $$\theta_1 > \theta_4$$

however $$\theta_4 > \theta_2$$

It will be seen, therefore, that irrespective of the positions of the two forwardly extending lugs 5 and 15 from the camera body side and the pawls 8 and 11 of the lens side, the two respective combinations engage without mutual collision, and the principle of the present invention is satisfied.

It will be readily seen that, while the above detailed description has related to the case of an ordinary, single-lens reflex camera, the present mechanism may be used directly, as it is, also to cameras of the quick-return, single-lens reflex type wherein the shutter and diaphragm blades reopen. In this case, the conditions of FIGS. 10 and 12 do not exist except when the opening and closing of the shutter blades take place on the camera side for the purpose of exposure. That is, since the diaphragm blade opening member 3 and the blade opening member 1 are constantly maintaining the shutter and diaphragm blades in their opened condition, only the states of FIGS. 11 and 13 exist.

Furthermore, by the application of this invention it is possible to provide a camera with automatic exposure control wherein the exposure is automatically controllable in even a more positive and simple manner as is described below. In the case of a camera capable of automatic coupling with an exposure meter, wherein the mechanism is adapted to make possible automatic coupling of the entire ranges of the shutter speed and the diaphragm with the exposure meter, it is necessary to make the range of measurement of the exposure meter extremely wide. In the case of exposure meters generally available at present, a certain limit exists in the ordinary range of exposure measurement, those wherein the exposure value is graded in approximately 8 to 17 stages being most generally used. On one hand, in the case of the camera, those having a range of exposure adjustment corresponding to exposure time (shutter speed) of the order of B, 1 to 1/500 second in 11 stages and diaphragm adjustment of the order of F:2 to F:22 in 8 stages are most commonly used. Accordingly, since a difference exists between the measurement range of the exposure meter and the exposure adjustment range of the camera, ranges wherein adjustment by means of the exposure meter cannot be made occur unavoidably. Furthermore, in the case wherein the exposure time (shutter speed) is selected beforehand, and the diaphragm aperture is automatically controlled by an exposure meter, photography at low shutter speed tends to cause shaking of the camera, whereby this expedient is undesirable. These problems can be solved by attaching a limiting device which limits the range of adjustment of the shutter speed, and so adapting the camera that, in the case of manual selection of exposure, the said limiting device does not engage, and the entire range of exposure adjustment possessed by the camera can be used; and in the case of selecting the exposure time (shutter speed) beforehand and automatic controlling of the diaphragm aperture by means of an exposure meter, the said limiting device is caused to engage and limit the adjustment range of the shutter speed setting member, whereby the exposure time (shutter speed) can be selected only within a suitable range. The details of a construction incorporating such a feature is described below with reference to FIGS. 14 through 17.

Figure 14:
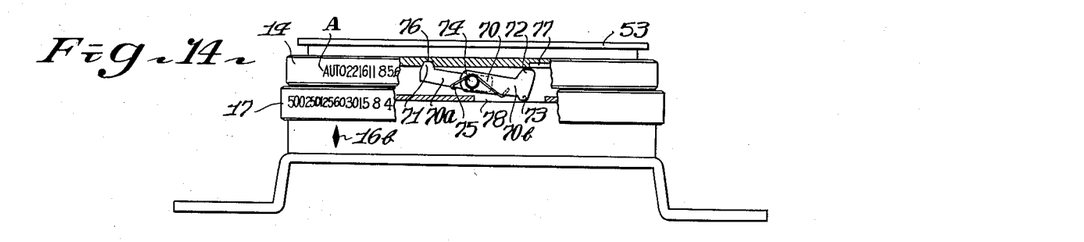
FIGS. 14 and 15 are plan or top views, partly in section and with parts cut away, showing the mutual relationship between the shutter speed setting member and the diaphragm setting member of one embodiment of the invention at the time of switching between manual and automatic operation.
Figure 15:
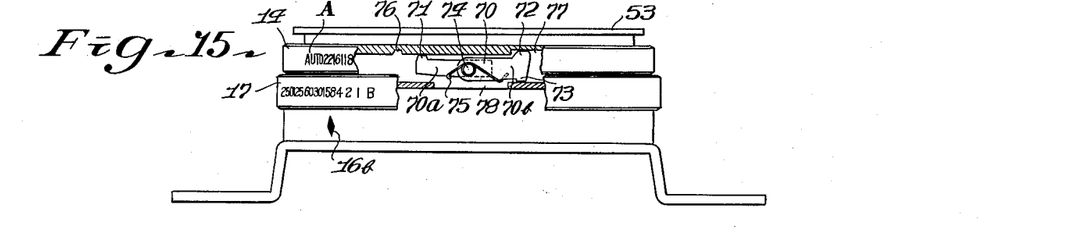

In FIGS. 14 and 15, a limiting device 70 composed of a member 70a and a member 70b which are pivoted rotatably at a fixed pivot 74 and caused by a spring 75 to have tendencies of rotating clockwise and counterclockwise, respectively, is disposed between the diaphragm setting ring 14 and the shutter speed setting ring 17. One end of this device 70 is provided with a tooth 71 which engages a notch 76 in the diaphragm setting ring 14. The other end of this device 71 is provided on one side with a tooth 72 which engages with a limit slot 77 on the diaphragm setting ring 14 and on the other side with a tooth 73 which engages with a clearance hole 78 in the shutter speed setting ring 17.

The notch 76 and limit slot 77 provided on the diaphragm setting ring 14 and the clearance hole 78 provided on the shutter speed setting ring 17 have such a positional relation that when an attempt is made to bring the automatic operation mark A of the diaphragm setting ring to coincide with the index 16b in order to obtain atuomatic exposure control of the camera, if the said index 16b is just confronting and coincident with the high-speed scale range (for example: 1/30 to 1/500 second) of the shutter speed setting ring 17, the automatic operation mark A will be able to coincide with the said index 16b as shown in FIG. 14; the tooth 71 on one end of the limiting device 70 will be caused by the spring 75 to be in elastically-maintained contact with the notch 76 of the diaphragm setting ring; the tooth 72 on one side of the other end will disengage from the limit slot 77; and the tooth 73 on the other side will engage with the clearance hole 78 of the shutter speed setting ring. Under this condition, the diaphragm setting ring 14, that is, the mark A, is held fixed by the notch 76 and tooth 71 in elastically-maintained contact, while the shutter speed setting ring 17 is able to rotate freely within the range determined by the limiting action of the tooth 73 on the two ends of the clearance hole 78. This range of rotation becomes the high-speed scale range (for example: 1/30 to 1/500 second), and it becomes impossible to bring a scale range of any lower speeds (for example 1/15 to 1 second and bulb) to coincide with the index 16b. In other words, the selection of exposure time (shutter speed) of the camera at the time of automatic exposure control is restricted within the high-speed range.

When an attempt is made to bring the automatic operation mark A of the diaphragm setting ring 14 to coincide with the index 16b in order to switch the camera to automatic exposure control, if the said index 16b, at the time, is confronting and coinciding with the low-speed scale range (for example: 1/15 to 1 second and bulb) of the shutter speed setting ring 17, the tooth 72 on one side of the other end of the limiting device 70 engages with an end of the limit slot 77, as illustrated in FIG. 15, and the tooth 73 on the other side separates from the clearance hole 78, thereby blocking the rotation of the diaphragm setting ring 14 and, at the same time, enabling the shutter speed setting ring 17 to rotate freely. Accordingly, the automatic operation mark A is rendered incapable of coinciding with the index 16b, while the adjustment of the shutter speed setting ring 17 over the entire speed range with respect to the index 16b becomes possible. Accordingly, in this case, the camera is selectively used either in the condition of manual control or in the condition of automatic control by moving the high-speed scale range of the shutter speed setting ring 17 towards the index 16b, then bringing the automatic operation mark A to coincide with index 16b.

Figure 16:
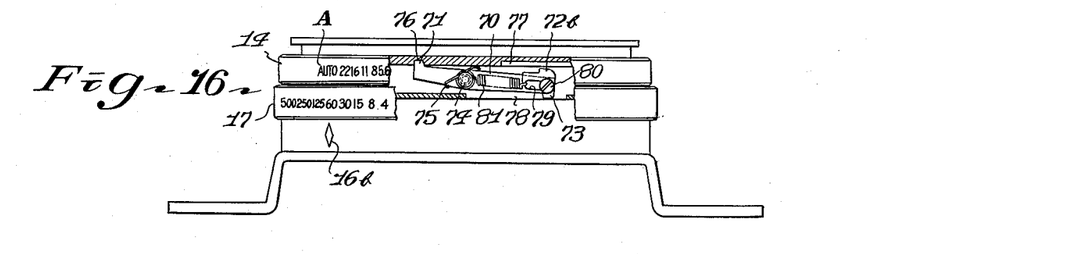
FIGS. 16 and 17 are plan or top views, partly in section and with parts cut away, showing the mutual relationship between the shutter speed setting member and the diaphragm setting member of another embodiment of the invention at the time of switching between manual and automatic operation.
Figure 17:
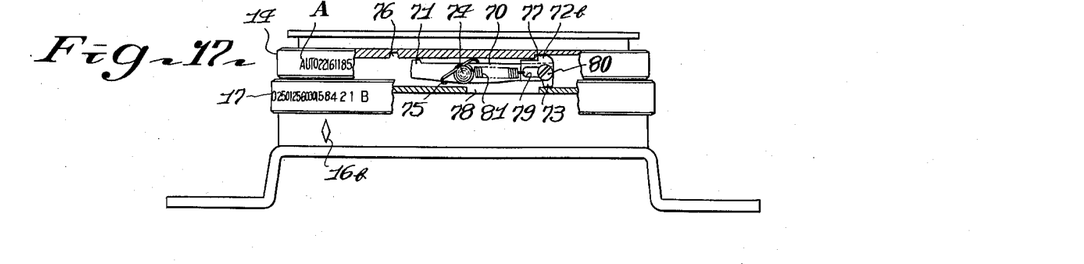

FIGS. 16 and 17 illustrate another embodiment of the limiting device for the switching between the automatic coupling and manual adjustment shown in the abovementioned FIGS. 14 and 15. In this embodiment, the tooth 72 on one side provided on the other end of the limiting device 70 of the previous embodiment has been omitted, and, in its place on the device 70, a tooth 72b, which is slideable in an elastic manner relative to the said device, is provided so as to engage with the limit slot 77. That is, the tooth 72b slides elastically relative to the device 70 through the engagement of a slot hole 79 formed in the base portion of the said tooth 72b with the pin portion of a screw 80 which holds the said base portion to the device 70 and through the tension of a spring 81.

FIG. 16 illustrates the condition wherein, upon the performance of exactly the same operation as shown in FIG. 14 of the previous embodiment, it is possible to bring the automatic operation mark A immediately to coincide with the index 16b when the high-speed range of the shutter speed scale is confronting the index 16b. Therefore, the camera is an automatically-coupled camera wherein only the high-speed scale range can be freely selected.

FIG. 17 illustrates a mechanism, the operation of which is somewhat different from that of the case shown in FIG. 15 of the preceding embodiment. That is, if an attempt is made to bring the automatic operation mark A to coincide with the index 16b when the low-speed range of the shutter speed scale is confronting the index 16b, the diaphragm setting ring 14 causes, through the end edge of the limit slot 77, the tooth 72b, which is on one side of the end of the device 70, and which is engaged with the said end edge, to move in unison against the force of the spring 81. Accordingly, if upon bringing the automatic operation mark A to coincide with the index 16b, the hand is removed from the diaphragm setting ring 14, the said tooth 72b will be returned by the tension of the spring 81, and this returning force will cause the tooth 72b to move the aforesaid end edge of the limit slot 77 to move with it in the reverse direction, thereby returning the diaphragm setting ring 14, that is, the automatic operation mark A, to the original position. Consequently, it becomes impossible to place the automatic operation mark A in coincidence with the index 16b. Therefore, when the camera is in this condition, it is used in this condition by manual adjustment or it is used after it has been switched to automatic coupling by first placing the high-speed range of the shutter speed scale in coincidence with the index 16b, then setting the automatic operation mark A in coincidence with the index 16b, this procedure being the same as that of the preceding embodiment. In the case of the present embodiment as shown in FIG. 17, it is not necessary to rotate the diaphragm setting ring 14 against the limiting device 70 with as great a force as in the preceding case shown in FIG. 15 in order to switch the camera to automatic control; therefore, the camera mechanism is protected.

It will be seen from the foregoing detailed description of embodiments of the present invention that they amply achieve the objects of the invention. That is, a camera capable of automatic control of the diaphragm aperture in accordance with the exposure time (shutter speed), corrected sensitivity (corrected for film exposure index, filter factor, etc.), brightness of the object to be photographed, and other factors is obtained. Moreover, through a blade opening member, diaphragm blade opening member, and two diaphragm actuating members, the camera becomes a single-lens reflex camera capable of automatic coupling with an exposure meter, and since the mechanism for automatic coupling with an exposure meter is switched by severing the link between the diaphragm blade opening member and the coupling cam provided to confront the exposure meter pointer, a camera wherein, by this switching, it is possible to use freely both automatic exposure control and manual adjustment of the exposure is obtained. Furthermore, when the diaphragm blade opening member, the diaphragm scale ring, and the two diaphragm actuating members are linked in a follow-up manner by the use of springs, it becomes possible to provide an interchangeable lens type camera wherein automatic coupling with an exposure meter is possible, and wherein the switching of the camera to automatic exposure control cannot be accomplished in the low-speed range of the exposure time (shutter speed) and can be accomplished in only the high-speed range. Furthermore, it is possible to adapt the mechanism so that once this switching has been accomplished, the use of the camera thereafter is possible only in the high-speed range of the exposure time.

Since it is obvious that many changes and modifications can be made in the above described details without departing from the nature and spirit of the invention, it is to be understood that the invention is not to be limited to the details described herein except as set forth in the appended claims.

What I claim is:

1. In a photographic camera of the type having a photographic lens, a built-in exposure meter, an adjustable diaphragm means including blades that can be opened and closed and an adjustable speed shutter, a shutter opening member carrying a lug, a diaphragm blade opening member having a forwardly extending lug, said diaphragm blade opening member being biased for rotation in one direction about the optical axis of the lens, a latching pawl on said diaphragm blade opening member to be contacted by said lug on said shutter opening member, a first diaphragm actuating member biased for rotation similar to the rotation of said diaphragm blade opening member, a pawl on said first diaphragm actuating member to be contacted by said forwardly extending lug on said diaphragm blade opening member, a second diaphragm actuating member, said blades being supported by and between said first and said second diaphragm actuating members whereby relative rotation of said diaphragm actuating members actuates said diaphragm blades, means to bias said second diaphragm actuating member for rotation in the same direction as the bias of said first diaphragm actuating member, a pawl on said second diaphragm operating member slidable a predetermined distance circumferentially of said second diaphragm actuating member and biased in the direction of bias of said second diaphragm actuating member, a diaphragm setting ring provided with a lug for engaging said biased pawl on said second diaphragm actuating member to arrest the rotation of said second diaphragm actuating member, a shutter speed setting ring, detent notches in said shutter speed setting ring, a correction ring for correcting the setting of the built-in exposure meter in accordance with the photographic factor of the film being used in the camera and a filter factor, said correction ring carrying a click detent to engage the detent notches in said shutter speed setting ring, a cam surface on said correcting ring, a cam follower biased against said cam surface on said correcting ring and drivingly connected to said camera shutter, whereby speed of said shutter is controlled, gear teeth mounted on said diaphragm blade opening member, a shaft parallel to the optical axis of said camera, a coupling gear secured to said shaft and meshing with said gear teeth, clutch means operated by said shaft, a cam stop plate for cooperating with said exposure meter to secure the setting of said exposure meter, rack and pinion means to move said cam stop plate, said clutch means selectively connecting said shaft and said pinion, said cam stop plate being of the type the movement of which is stopped by the pointer of said exposure meter, a cam surface on said diaphragm setting ring, and a clutch actuating rod engaging said cam surface on said diaphragm setting ring whereby, upon moving said diaphragm setting ring to a predetermined position, said clutch is engaged to render the operation of the diaphragm automatically dependent on the exposure meter.

2. In a camera, in combination, an exposure meter, a movable stop member the position of which is determined by said exposure meter, a step-cam movable toward said movable stop member to sense the position of said stop member and therefore to sense the setting of said exposure member, diaphragm means including a plurality of diaphragm blades and two relatively rotatable plates between which said blades are mounted and by relative rotation of which the diaphragm opening is determined, a diaphragm blade opening member, coupling means by which said blade opening member is coupled to said step cam, whereby said diaphragm opening is automatically adjusted, and a diaphragm setting ring, a clutch means interposed in said coupling means whereby said diaphragm blade opening member may be uncoupled from said step cam means, a cam surface on said diaphragm setting ring, and means operated by said cam surface on said diaphragm setting ring whereby said clutch means may be selectively engaged or disengaged.

3. In a photographic camera of the reflex type having a shutter that must be cocked and in which the diaphragm opening is controlled by two relatively rotatable diaphragm actuating members from and between which a plurality of diaphragm blades are suspended and in which the first of said rotatable diaphragm actuating members is operated by cocking the shutter mechanism to open the diaphragm for use of the camera lens as a view finder, and the second of said members is engaged by a diaphragm setting member, an exposure meter, sensing means by which the determination of illumination made by said exposure meter may be used to adjust the relative positions between said two relatively rotatable diaphragm actuating members, coupling means including a clutch to transfer the sensed meter reading of the exposure meter to said first diaphragm actuating member, means for selectively manually setting said second diaphragm actuating member to a predetermined diaphragm opening, a cam means on said means for manually setting said second diaphragm actuating member, and means operated by said cam means to disengage said clutch when said means for manually setting said second diaphragm actuating member is moved into the range of manual settings from a position where the clutch is engaged to provide for automatic control of the diaphragm opening.

References Cited in the file of this patent
UNITED STATES PATENTS

| | | |
|---|---|---|
| 2,868,095 | Gebele | Jan. 13, 1959 |
| 2,913,969 | Faulhaber | Nov. 24, 1959 |
| 2,935,921 | Rentschler | May 10, 1960 |
| 2,943,545 | Fahlenberg | July 5, 1960 |
| 2,969,004 | Gebele | Jan. 24, 1961 |
| 2,974,578 | Wittel | Mar. 14, 1961 |
| 3,013,478 | Gebele | Dec. 19, 1961 |